(12) United States Patent
Bi et al.

(10) Patent No.: US 8,605,649 B2
(45) Date of Patent: Dec. 10, 2013

(54) METHOD FOR PROVIDING RELIABLE COMMUNICATION SESSION ESTABLISHMENT IN A COMMUNICATION INFRASTRUCTURE

(75) Inventors: Qi Bi, Morris Plains, NJ (US); Stanley Vitebsky, Morristown, NY (US)

(73) Assignee: Alcatel Lucent, Paris (FR)

( * ) Notice: Subject to any disclaimer, the term of this patent is extended or adjusted under 35 U.S.C. 154(b) by 1127 days.

(21) Appl. No.: 11/642,835

(22) Filed: Dec. 21, 2006

(65) Prior Publication Data
US 2008/0151770 A1 Jun. 26, 2008

(51) Int. Cl.
*H04W 4/00* (2009.01)

(52) U.S. Cl.
USPC .......................................................... 370/328

(58) Field of Classification Search
USPC .................................. 370/252, 244, 259, 328
See application file for complete search history.

(56) References Cited

U.S. PATENT DOCUMENTS

| | | | | |
|---|---|---|---|---|
| 3,854,014 | A * | 12/1974 | Akin et al. ................ | 379/209.01 |
| 6,154,644 | A * | 11/2000 | Murray ...................... | 455/414.1 |
| 6,631,270 | B1 * | 10/2003 | Dolan ........................... | 455/453 |
| 6,944,449 | B1 | 9/2005 | Gandhi et al. | |
| 7,145,997 | B2 * | 12/2006 | Poikselka et al. ........ | 379/210.01 |
| 2002/0142761 | A1 * | 10/2002 | Wallstedt et al. ............. | 455/416 |
| 2003/0043804 | A1 * | 3/2003 | Kumar et al. ................ | 370/390 |
| 2004/0203680 | A1 * | 10/2004 | Sylvain ......................... | 455/417 |

FOREIGN PATENT DOCUMENTS

| | | |
|---|---|---|
| EP | 1 603 339 | 12/2005 |
| WO | WO 00/14991 | 3/2000 |
| WO | WO 01/76305 | 10/2001 |
| WO | WO 2006/056230 | 6/2006 |
| WO | WO 2006/137803 | 12/2006 |

OTHER PUBLICATIONS

International Search Report and Written Opinion dated Jul. 14, 2008.
European Search Report dated Jul. 19, 2010.
Japanese Office Action dated Oct. 19, 2011 (w/English translation).

* cited by examiner

*Primary Examiner* — Mark Rinehart
*Assistant Examiner* — Mohammad Anwar
(74) *Attorney, Agent, or Firm* — Harness, Dickey & Pierce

(57) ABSTRACT

The method provides for establishing a communication session in a hierarchical communication system between a source party and at least one destination party. Hierarchical communication systems generally have communication nodes at different levels of hierarchy. In one embodiment, connection information for the communication session is stored if establishing the communication session is blocked at a node as a result of a blocking condition at the blocking node. Establishment of the communication session is initiated based on the stored connection information if the blocking condition no longer exists at the blocking node.

20 Claims, 4 Drawing Sheets

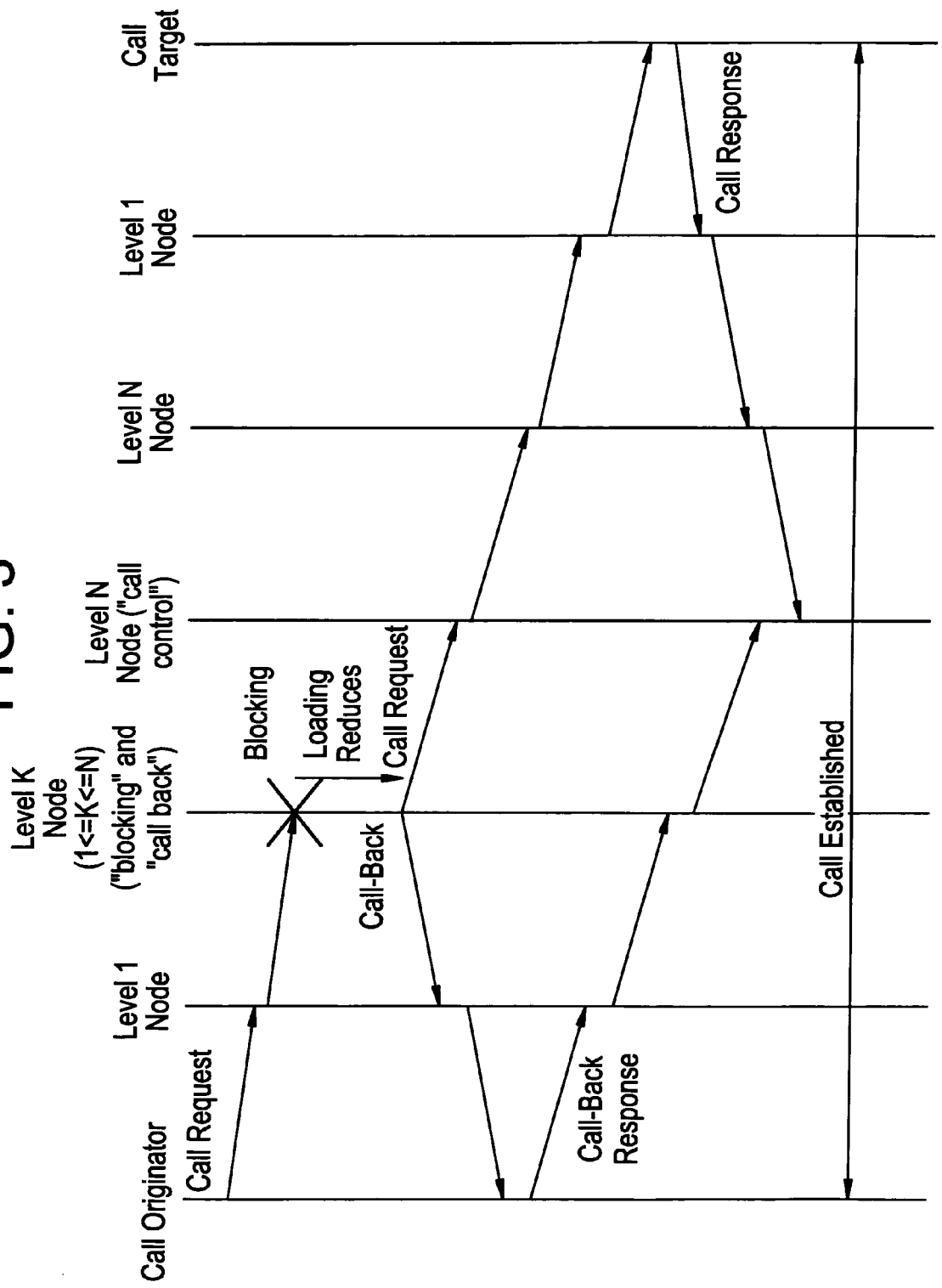

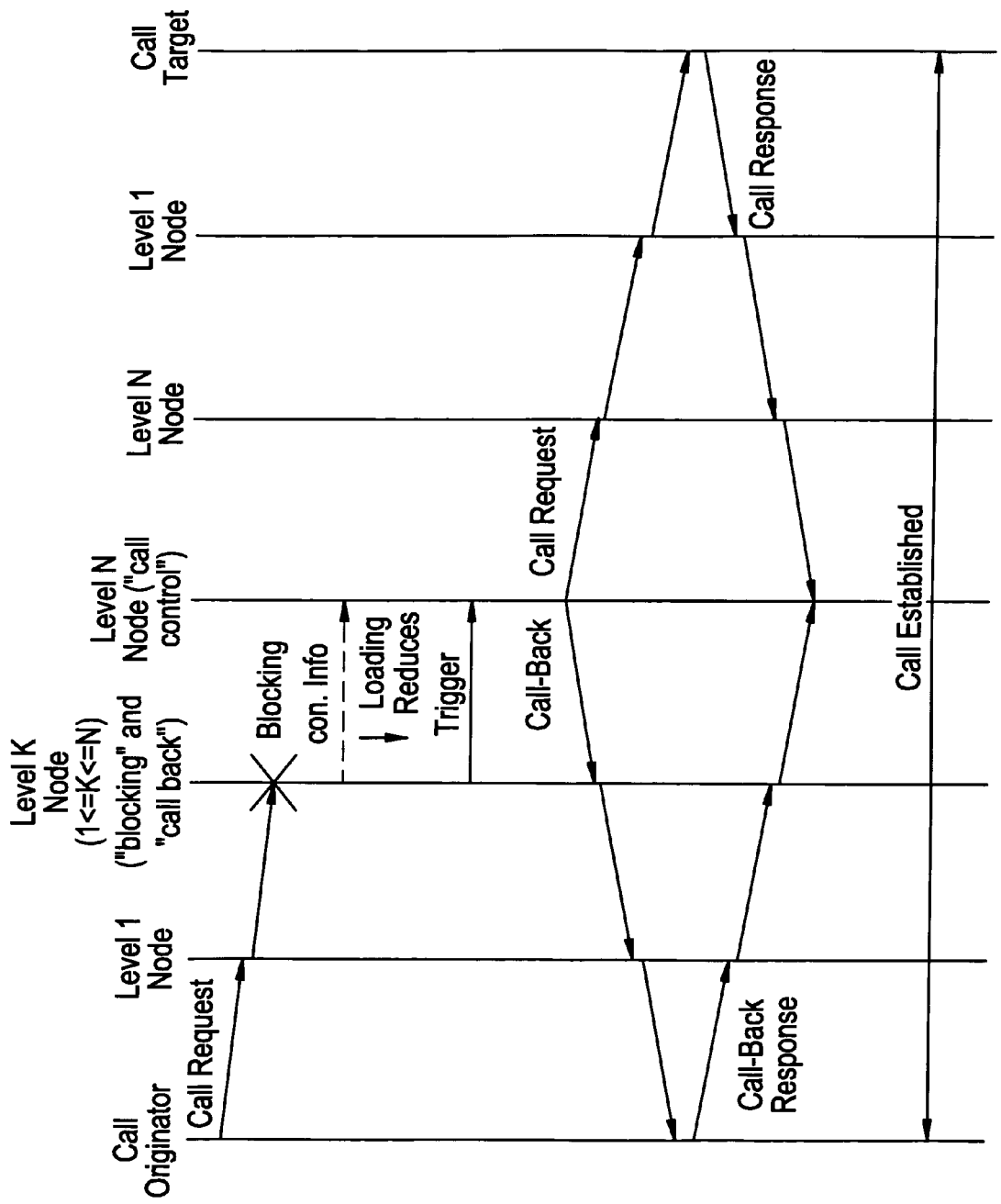

METHOD FOR PROVIDING RELIABLE COMMUNICATION SESSION ESTABLISHMENT IN A COMMUNICATION INFRASTRUCTURE

BACKGROUND OF THE INVENTION

Typical communication networks such as wireless networks have a hierarchical infrastructure. For example, in wide area wireless networks, mobile devices communicate with base stations (or BTSs—base transceiver stations) deployed over a large area and multiple base stations are controlled by centralized nodes (such as BSCs—base station controllers or a RNCs—radio network controllers). These controllers may or may not be connected and/or controlled further by a next higher-level node, such as a mobile switching center (MSC).

In the converged voice/data network architecture, the next higher level node above the BSCs or RNCs may be an IP Multimedia Subsystem (IMS) instead of a traditional MSC. Or, the IP IMS may be a node at a higher level than the MSC and connected to multiple MSCs.

The nodes in this hierarchical structure have various hardware and other resource limitations. Consequently, these nodes perform admission and overload control functions to ensure that a high load does not create unstable operating conditions and that there are enough resources to support end-to-end connectivity once a call is admitted to the system. When an extraordinary access load occurs, for example, such as due to an emergency situation, a significant number of call access attempts may be denied/blocked.

The blocking may occur at different levels of infrastructure hierarchy. Once the blocking has occurred, the call request is dropped at the node at which the blocking has occurred. The call originator is forced to retry access connection after some time.

In such a situation, the call target may never be notified that a call was intended for them.

SUMMARY OF THE INVENTION

The present invention relates to a method of establishing a communication session in a hierarchical communication system between a source party and at least one destination party. Hierarchical communication systems generally have communication nodes at different levels of hierarchy.

In one embodiment, connection information for the communication session is stored if establishing the communication session is blocked at a node as a result of a blocking condition at the blocking node. Establishment of the communication session is initiated based on the stored connection information if the blocking condition no longer exists at the blocking node.

In one embodiment, the connection information is stored at the blocking node. Here, the initiating step may be performed by the blocking node. Alternatively, the initiating step may be performed at a node other than the blocking node; for example, a higher level node.

The initiating step includes sending a first communication request to the destination party indicated by the connection information and sending a second communication request to the source party. The first communication request requests the destination party to participate in the communication session, and the second communication request requests the source party to participate in the communication session.

According to another embodiment, establishment of the communication session is initiated, based on the stored connection information, a period of time after the communication session is blocked.

BRIEF DESCRIPTION OF THE DRAWINGS

The present invention will become more fully understood from the detail description given herein below and the accompanying drawings which are given by way of illustration only, wherein like reference numerals designate corresponding parts in the various drawings, and wherein:

FIG. 3 illustrates a call flow diagram of the example where the call blocking node performs the call connection process; and FIG. 4 illustrates a call flow diagram of the example where a node at a higher level than the call blocking node performs the call connection process.

DETAILED DESCRIPTION OF EXAMPLE EMBODIMENTS

Figure 1:
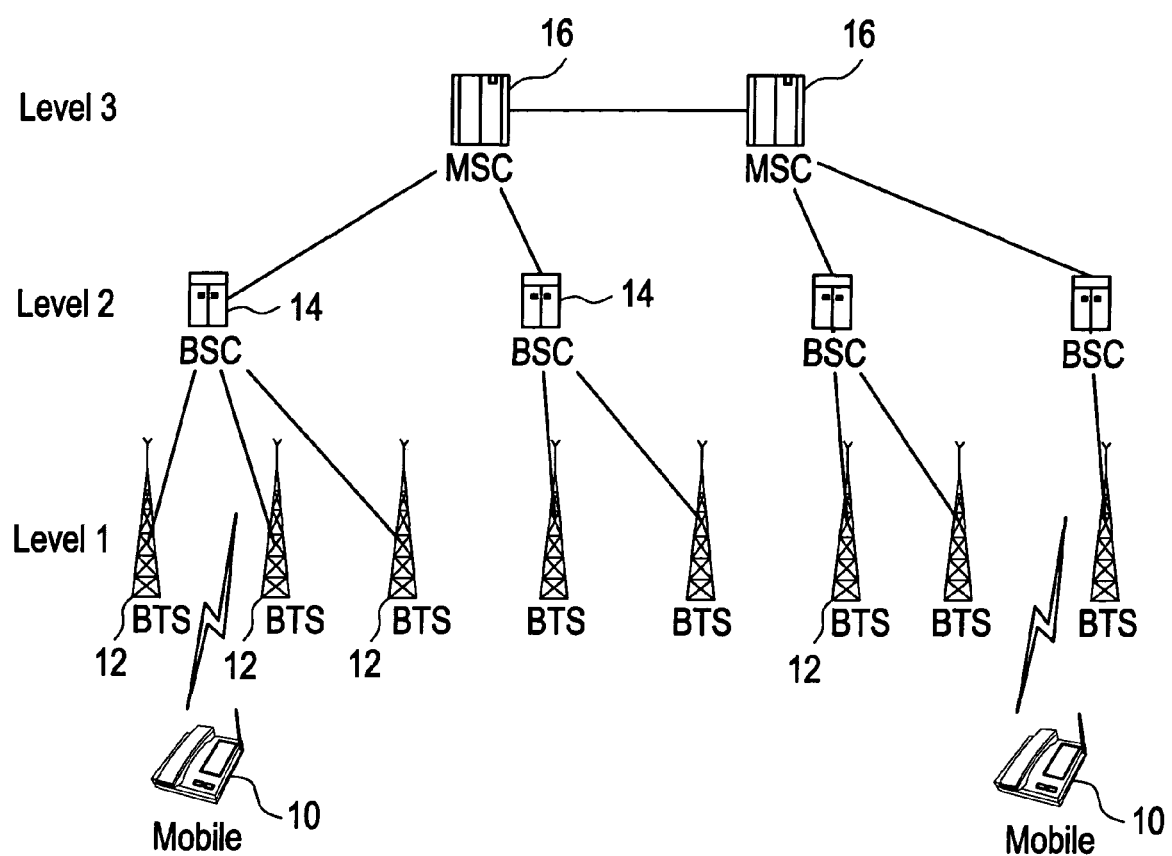
FIG. 1 illustrates a well-known wireless communication network.

For the purposes of example only, the present invention will be described with respect to the multilevel wireless communication infrastructure shown in FIG. 1. FIG. 1 illustrates the wireless communication infrastructure in a hierarchical fashion having different levels. However, the present invention is applicable to any hierarchical communication system, for example, a wireline communication system.

As shown, mobile stations 10 communicate wirelessly with one or more base transceiver stations (BTSs) 12. While the mobile stations 10 are illustrated as a wireless phone in FIG. 1, a mobile station 10 may be any device capable of wireless communication such as a wireless phone, wireless equipped PDA, wireless equipped computer, etc.

The base transceiver stations 12 are the first level, level 1, of access node. The base transceiver stations 12 as the level 1 access nodes communicate with base station controllers (BSCs) 14 as level 2 access nodes. The base station controllers 14 communicate with mobile switching centers (MSCs) 16 as the next higher-level, level 3, access nodes.

In FIG. 1, the MSCs are illustrated as the highest level access node. However, it will be understood that in other wireless communication networks, there may be further, higher access node levels. In the converged voice/data network architecture, the next higher level node above the BSCs or RNCs may be an IP Multimedia Subsystem (IMS) instead of a traditional MSC. Or, the IP IMS may be a node at a higher level than the MSC and connected to multiple MSCs. The present invention is contemplated as applicable to any wireless communication infrastructure.

Furthermore, the present invention is applicable to any hierarchical communication network. In a general hierarchical network, there could be N different levels of access nodes, each performing, for example, call admission control procedures. While the present invention will be described at times using a call as an example form of communication, the present invention is applicable to any form of communication session to be established between two or more parties. It is intended that the term communication session cover both voice and data communication, and to cover both circuit switched and data packet communication.

For a normal call establishment, the resources are allocated along an ascending path and a descending path. Generally the ascending path is from the call originator to the level N node via the level 1 to N−1 nodes. The descending path is generally from a possibly different level N node (which has a peer connection to the level N node on the originating side) to the target mobile station 10 via generally different level 1 to N−1 nodes.

A similar sequence of allocations occurs in case of mobile-to-land and land-to-mobile call establishment. If the originator and the target belong to the same branch of the hierarchy at level K<N, it may be possible to loop back the call at level K without going to level N or the call may still be routed through the common nodes above level K to the level N node and back. In a typical implementation of the layered communication protocol stack, a node on a particular level of hierarchy only processes the information embedded in the header of a particular protocol layer without knowledge of the specifics on the other layers. The information accessible to a particular node may include addressing and grade of service information providing either the end-to-end or hop-by-hop routing directions to the node.

During a high access load on the network, any node on the communication path from the originating mobile station 10 to the target mobile station 10 may block call admission. It will be understood that the nodes may use any well-known call blocking methodology.

According to an embodiment of the present invention, the node that makes a decision to reject or block the call, stores the call request information in memory instead of discarding the call request information. This information for later connecting the call may be stored as a copy of the original call request packet or the call connection information may be stored as routing information contained in the header accessible to the particular node.

When the loading on the node reduces to a sufficiently low level so as not to cause further admission blocking (appropriate hysteresis on the loading measurement may be applied), the blocking node uses the stored call connection information to establish the connection between the parties of the previously blocked call.

To establish such a connection, the node should have the capability to generate two call requests (note that if the original call was a multi-party call, then the number of call requests should correspond to the number of parties participating in the original call). One call request is sent to the original call target destination and the other to the original call source (call-back).

Figure 2:
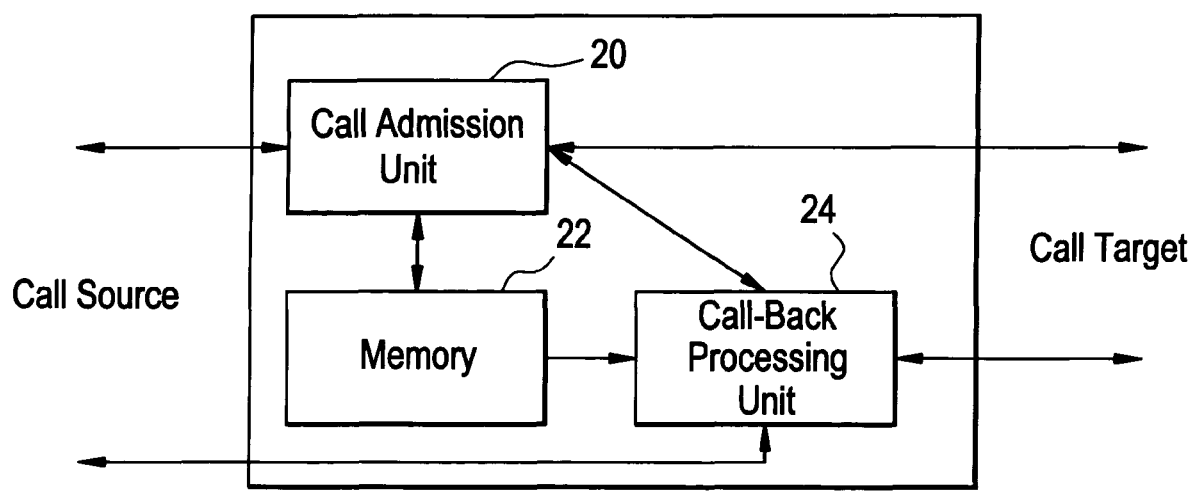
FIG. 2 illustrates the structure of a network node for implementing admission control blocking and call-back functionality according to an embodiment of the present invention.

FIG. 2 illustrates the structure of a network node for implementing admission control blocking and call-back functionality according to an embodiment of the present invention. As shown, a call admission unit 20 determines according to any well-known methodology whether to block a call. If the call admission unit 20 decides to block a call, the call request information is stored by the call admission unit 20 in a memory 22.

The call admission unit 20 continues to monitor the condition (e.g., loading) that resulted in blocking the call. Once the condition no longer exists, the call admission unit 20 notifies a call-back processing unit 24. Most call blocking methodologies are based on blocking calls if a measured load exceeds a first load threshold. The call admission unit 20 may determine that the condition no longer exists when the measured load falls below a second load threshold, where the second load threshold is less than the first load threshold. Having the second load threshold less than the first load threshold provides a hysteresis effect and prevents ping-ponging between a blocking and unblocking state.

If the call-back processing unit 24 receives notification from the call admission unit 20 that the call blocking condition no longer exists, the call-back processing unit 24 obtains the call connection information from the memory 22. Using the call connection information, the call-back processing unit 24, according to one embodiment of the present invention, generates two call requests (note that if the original call was a multi-party call, then the number of call requests should correspond to the number of parties participating in the original call). One call request is sent to the original call target destination and the other to the original call source (call-back). Once both connections are established, the call can proceed and the voice or data traffic may flow. In this embodiment, the node that blocked the call is the same node that is establishing the call after the blocking condition no longer exists. It will be appreciated that to accomplish this at a lower level node, the blocking node should be able to access and understand end-to-end routing information embedded at different protocol layers. To accomplish this, the node may process the higher layer protocol headers if they are supplied with the original call request. If this is not possible, the node may request this information from a higher level node that has access and capability to provide the information.

FIG. 3 illustrates a call flow diagram of an example where the call blocking node performs the call connection process. As shown, the example assumes a node at level K in an ascending path blocks the call request from a call originator (i.e., the source party) because of excessive loading at the node. At some subsequent time, the blocking node determines that the loading has reduced to a point that the blocking condition no longer exists. The blocking node then initiates establishing the call. As shown, the blocking node sends the call request (or call-back) to the source party and the call request to the destination (or target) party. The call is considered established when both the call request and call-back are answered by the called parties and the answers reach the "call control" node at level N (e.g., an MSC).

The "call control" node is the node that can process and generate signaling messages and perform actions pertaining to the end-to-end call control. In typical communication systems such nodes are positioned at higher levels of the node hierarchy, while the lower level nodes only perform local access control, routing and resource management. The call control node has a view into the end-to-end protocol layer, so the call control node may identify a call by a call id or a session id, or a combination of source and destination addresses and communication ports at the originating and terminating entities, etc. Using these identifiers, etc. the call control node is able to recognize both answers as pertaining to the same call and establish the connection. Alternatively, the call control node may not need the response to a call back from the originating party. Instead the call control node may treat the call passed by the blocking node as a regular new call. The call-back to the originating party is used just to notify the originating party that the call it placed previously is now proceeding. The call control node may discard the response from the call back party.

The call-back to the source (or originating) party and call request to the destination party may be generated by the blocking node in parallel (as shown). Alternatively, one of the call-back to the source party and the call request to the destination party may be made sequentially after the response to the other of the call-back to the source party and the call request to the destination party is received.

It will be understood that the present invention is not limited to this methodology for establishing the connection between the source and destination parties. Instead, many other options may be implemented in the network to establish the connection once the blocking condition no longer exists.

For example, the node initiating the call-back does not need to be the same node that rejected the original call. In this case, the call-back processing unit 24 of the blocking node may request a higher level node on the path (ascending or descending) to serve as an anchor point for the call connections.

In this case the node initiating the call-back most likely (but not necessarily) belongs to a higher level of hierarchy than the node that rejected the original call. The blocking node does not need to have end-to-end routing information embedded in the protocol header at the higher layer and accessible to the nodes on the higher level of hierarchy (the call-back node would belong to this level of hierarchy). To implement this option, the routing information may be stored on the node that rejected the original call (i.e., blocking node), or on the higher level node generating a call-back (i.e., call-back node)

If the routing information is stored at the blocking node, the call-back trigger may be based on the loading of the blocking node falling below the blocking threshold by a certain amount. Once this happens, the blocking node may forward the original call request to the call-back node with an indication that the request requires a call-back to the originating node.

In the routing information is stored at the higher level node, the routing information has to be delivered to the call-back node either prior to the occurrence of blocking or after blocking. If the routing information is pre-stored at the higher level node prior to blocking, the fact that the blocking has occurred on a different node is communicated from the blocking node to the higher level node either at the time of blocking or at a later time. For example, the call admission unit 20 may send a blocking indicator to the higher level node for the call, which instructs the higher level node to store the routing information.

Once the blocking condition no longer exists, the call-back processing unit 24 at the blocking node may issue a call-back trigger to the higher level node. The call-back trigger indicates that the higher level node should initiate establishing the call between the source and destination parties. Alternatively, the call admission unit 20 may send the trigger. This trigger indicates the load blocking condition no longer exists. The higher level node initiates establishing the call between the source and destination parties in response to this trigger.

FIG. 4 illustrates a call flow diagram of the example where a node at a higher level than the call blocking node performs the call connection process. As shown, the example assumes a node at level K in an ascending path blocks the call request from a call originator (i.e., the source party) because of excessive loading at the node. At some subsequent time, the blocking node determines that the loading has reduced to a point that the blocking condition no longer exists. The blocking node then initiates establishing the call. As further shown, the dashed line indicates an optional transmission of the routing information from the blocking node to the call-back node after the blocking has occurred.

Once the blocking condition no longer exists, the blocking node sends the trigger to the higher level node. In response, the higher level node sends the call-back to the source party and the call request to the destination (or target) party. The call is considered established when both call request and call-back are answered by the called parties and the answers reach the "call control" node at level N (e.g., an MSC). In this embodiment, the call back signaling exchange may have an embedded call id (assigned by the call control node) to identify the call and to relate the responses from both parties to each other.

The call-back to the source (or originating) party and call request to the destination party may be generated by the higher level node in parallel (as shown). Alternatively, one of the call-back to the source party and the call request to the destination party may be made sequentially after the response to the other of the call-back to the source party and the call request to the destination party is received.

Furthermore, while FIG. 4 illustrates one level of separation between the blocking node and the higher level node performing the call establishment operation, more than one level may exist between these nodes.

As a further alternative, if the blocking node does not maintain any state information with respect to the call, the blocking node may send the trigger to the higher level node on expiration of a timer started upon blocking the call.

Various back-off schemes known in the art may also be used to limit the processing impact from the call-back retries. The maximum number of allowed call-back attempts may also be limited.

The present invention significantly improves the reliability of call establishment in cases where the network experiences unusually high call access volume, for example, as in the cases of emergency.

The invention being thus described, it will be obvious that the same may be varied in many ways. Such variations are not to be regarded as a departure from the invention, and all such modifications are intended to be included within the scope of the invention.

We claim:

1. A method of establishing a communication session in a hierarchical communication system between a source party and at least one destination party, the hierarchical communication system having communication nodes at different levels of hierarchy, the method comprising:
   storing connection information for the communication session if establishing the communication session is blocked as a result of a blocking condition at a blocking node;
   initiating establishment of the communication session based on the stored connection information if the blocking condition no longer exists at the blocking node, the blocking node being in a communication path between the source party and the at least one destination party; and
   sending the connection information from the blocking node to a higher level node for call control, the higher level node being in the communication path between the source party and the at least one destination party, the higher level node being at a higher level in the communication system than the blocking node.

2. The method of claim 1, wherein the storing stores the connection information at the blocking node.

3. The method of claim 2, wherein the initiating is performed by the blocking node.

4. The method of claim 3, wherein the initiating comprises:
   sending a first communication request to the destination party indicated by the connection information, the first communication request requesting the destination party to participate in the communication session; and
   sending a second communication request to the source party indicated by the connection information, the second communication request requesting the source party to participate in the communication session.

5. The method of claim 4, wherein the sending a first communication request and the sending a second communication are performed simultaneously.

6. The method of claim 4, wherein one of the sending a first communication request and the sending a second communication is performed before the other.

7. The method of claim 2, wherein the initiating is performed by a node other than the blocking node.

8. The method of claim 7, wherein the other node is the higher level node.

9. The method of claim 8, further comprising:
sending a trigger from the blocking node to the higher level node if the blocking condition no longer exists, wherein the initiating is performed by the higher level node in response to the trigger.

10. The method of claim 9, wherein the initiating comprises:
sending a first communication request to the destination party indicated by the connection information, the first communication request requesting the destination party to participate in the communication session; and
sending a second communication request to the source party indicated by the connection information, the second communication request requesting the source party to participate in the communication session.

11. The method of claim 2, further comprising:
determining the blocking condition exists at the blocking node if a load at the blocking node exceeds a first load threshold, wherein
the storing stores the connection information if the determining determines the blocking condition exists.

12. The method of claim 1, wherein the initiating is performed by a node other than the blocking node.

13. The method of claim 12, wherein the other node is the higher level node.

14. The method of claim 13, further comprising:
sending a trigger from the blocking node to the higher level node if the blocking condition no longer exists, wherein the initiating is performed by the higher level node in response to the trigger.

15. The method of claim 14, wherein the initiating comprises:
sending a first communication request to the destination party indicated by the connection information, the first communication request requesting the destination party to participate in the communication session; and
sending a second communication request to the source party indicated by the connection information, the second communication request requesting the source party to participate in the communication session.

16. The method of claim 1, wherein the communication network is one of a wireless network and a wireline network.

17. The method of claim 1, wherein the communication session is a call.

18. The method of claim 1, wherein the blocking node is a base station and the higher level node is a mobile switching center.

19. A method of establishing a communication session in a hierarchical communication system between a source party and at least one destination party, the hierarchical communication system having communication nodes at different levels of hierarchy, the method comprising:
storing connection information for the communication session if establishing the communication session is blocked as a result of a blocking condition at a blocking node, the storing stores the connection information at the blocking node;
initiating establishment of the communication session based on the stored connection information if the blocking condition no longer exists at the blocking node, the blocking node being in a communication path between the source party and the at least one destination party;
sending the connection information from the blocking node to a higher level node for call control, the higher level node being in the communication path between the source party and the at least one destination party; and
determining the blocking condition exists at the blocking node if a load at the blocking node exceeds a first load threshold, the storing stores the connection information if the determining the blocking condition determines the blocking condition exists; and
determining that the blocking condition no longer exists if the load at the blocking node falls below a second load threshold, the second load threshold being less than the first load threshold.

20. A method of establishing a communication session in a hierarchical communication system between a source party and at least one destination party, the hierarchical communication system having communication nodes at different levels of hierarchy, the method comprising:
storing connection information for the communication session if establishing the communication session is blocked at a node;
initiating establishment of the communication session based on the stored connection information, a period of time after the communication session is blocked, the node being in a communication path between the source party and the at least one destination party; and
sending the connection information from the blocking node to a higher level node for call control, the higher level node being in the communication path between the source party and the at least one destination party, the higher level node being at a higher level in the communication system than the blocking node.

* * * * *